United States Patent [19]

Pedain et al.

[11] Patent Number: 4,737,566

[45] Date of Patent: Apr. 12, 1988

[54] PROCESS FOR THE PREPARATION OF OLIGOURETHANES CONTAINING FREE ISOCYANATE GROUPS, THE OLIGOURETHANES OBTAINABLE BY THIS PROCESS AND THEIR USE AS BINDERS OR BINDER COMPONENTS IN MOISTURE HARDENING ONE-COMPONENT LACQUERS

[75] Inventors: Josef Pedain, Cologne; Michael Sonntag, Odenthal, both of Fed. Rep. of Germany

[73] Assignee: Bayer Aktiengesellschaft, Leverkusen, Fed. Rep. of Germany

[21] Appl. No.: 34,175

[22] Filed: Apr. 2, 1987

[30] Foreign Application Priority Data

Apr. 18, 1986 [DE] Fed. Rep. of Germany ....... 3613064

[51] Int. Cl.$^4$ .............................................. C08G 18/32
[52] U.S. Cl. ......................................... 528/76; 528/77; 528/78; 528/79; 528/80; 528/83; 528/85; 427/336; 427/337; 427/340; 427/385.5

[58] Field of Search ....................... 528/76, 77, 78, 79, 528/80, 83, 85; 427/336, 337, 340, 385.5

[56] References Cited

FOREIGN PATENT DOCUMENTS 3417475 11/1985 Fed. Rep. of Germany .
3502265 7/1986 Fed. Rep. of Germany .

*Primary Examiner*—Maurice J. Welsh
*Attorney, Agent, or Firm*—Gene Harsh; Joseph C. Gil; Thomas W. Roy

[57] ABSTRACT

The present invention is directed to a process for the preparation of an oligourethane and free isocyanate groups which soluble in aromatic solvents and suitable as a lacquer binder by reacting an organic diisocyanate with a high molecular polyol and a low molecular weight polyol which contains 2,2,4-trimethylpentane-1,3-diol, its ethoxylation and/or propoxylation products or addition products of this low molecular weight diol with $\epsilon$-caprolactone. The present invention is also directed to oligourethanes produced by this process and to their use as the binder or binder component in moisture hardening one-component lacquers.

9 Claims, No Drawings

PROCESS FOR THE PREPARATION OF OLIGOURETHANES CONTAINING FREE ISOCYANATE GROUPS, THE OLIGOURETHANES OBTAINABLE BY THIS PROCESS AND THEIR USE AS BINDERS OR BINDER COMPONENTS IN MOISTURE HARDENING ONE-COMPONENT LACQUERS

BACKGROUND OF THE INVENTION

1. Field of the Invention

This invention relates to a new process for the preparation of oligourethanes containing free isocyanate groups which are soluble in aromatic solvents, to the oligourethanes with free isocyanate groups obtainable by this process and their use as binders or binder components in moisture hardening one-component lacquers.

2. Description of the Prior Art

Isocyanate prepolymers used as binders for moisture hardening one-component lacquers are well known in principle and general descriptions of these prepolymers are given, for example, in H. Kittel: Lehrbuch der Lacke and Beschichtungen, 1973, Volume I, part 2, page 572 et seq. They are generally prepared from low molecular weight polyols and macropolyols which are reacted with diisocyanates in proportions corresponding to a NCO/OH ratio of 1.4 to 2.0.

The solvents used in the state of the art for moisture hardening PUR lacquers are generally polar solvents such as esters of acetic acid, e.g. ethyl acetate or ethyl glycol acetate, optionally mixed with solvents which are less polar, such as hydrocarbons. The exclusive use of hydrocarbons as solvents is generally not possible because the solutions become very cloudy when left to stand or when prepared by diluting concentrated solutions to the working concentration. This renders them unsuitable for use.

The use of polar solvents, in particular ester-based solvents, in one-component polyurethane lacquers according to the state of the art has the further disadvantage that polar solvents, e.g. the acetic acid esters predominantly used, are retained in small quantities in the cured lacquer film for a long time. When these lacquers are used externally and therefore exposed to weathering, these esters undergo hydrolysis. The acetic acid then formed has two very disadvantageous effects: (1) it catalyzes the degradation of the lacquer films and (2) in lacquers applied to metal it reduces the protection against corrosion provided by the lacquer. Both of these factors reduce the durability of the lacquer coat.

It was therefore an object of the present invention to provide one-component lacquer binders which would form clear solutions in comparatively non-polar aromatic hydrocarbons and which could be further diluted to the required working concentration with apolar solvents such as aromatic or aliphatic hydrocarbons.

This problem was able to be solved by providing the process according to the invention described below for the preparation of oligourethanes containing free isocyanate groups and soluble in aromatic solvents. In this process, organic diisocyanates are reacted with varying quantities of macropolyols in the molecular weight range of from 500 to 10,000 and 2,2,4-trimethylpentane diol-(1,3) or the hydroxyl-containing derivatives thereof described below and optionally other low molecular weight polyols.

The preparation of straight chain, high molecular weight polyurethanes soluble in aromatic solvents by a process using 2,2,4-trimethyl pentane diol-(1,3) as chain lengthening agent has already been disclosed in DE-OS No. 3,417,475, but it could not be expected that the use of this diol would also provide the possibility of obtaining branched chain, comparatively low molecular weight oligourethanes with free isocyanate groups in a form that is soluble in aromatic solvents since straight chain, high molecular weight polyurethanes and comparatively low molecular weight branched chain isocyanate prepolymers belong to different classes of compounds with completely different structures.

Low molecular weight, urethane-modified diisocyanates based on 2,2,4-trimethyl-pentane diol-(1,3) and the hydroxyl-containing derivatives thereof are described in an earlier proposal by the present applicants (German patent application No. P35 02 265.5), but no macropolyols of the type described below as starting component (b) according to the invention are used in the preparation of these modified polyisocyanates.

SUMMARY OF THE INVENTION

The present invention is directed to a process for the preparation of oligourethanes with free isocyanate groups suitable for use as lacquer binders and soluble in aromatic solvents by the reaction of
 (a) organic diisocyanates with
 (b) macropolyols having a molecular weight of 500 to about 10,000 and
 (c) low molecular weight polyols having a molecular weight of 62 to 499
in amounts corresponding to an equivalent ratio of isocyanate groups to hydroxyl groups of about 1.4:1 to 2:1, characterized in that the compounds used as component (c), optionally in the presence of other low molecular weight polyols, are diols corresponding to the general formula $$R^1[-O(R^2-O-)_nH]_2$$

wherein
 $R^1$ denotes a group of the formula

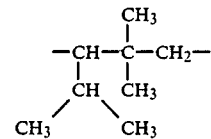

$R^2$ denotes a group of the formula

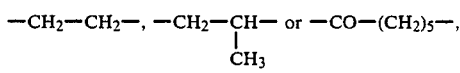

and n stands for 0, 1 or 2,
these compounds being used in a quantity such that about 1 to 45% by weight, based on the weight of all of the starting components (a) to (c), and such that the nature and proportions of the polyhydroxyl functionality of these compounds is 2.05 to 3.5.

The present invention further relates to oligourethanes with free isocyanate groups obtainable by this process.

Finally, the present invention relates to the use of the oligourethanes with free isocyanate groups obtainable by the process according to the invention as binders or binder components in moisture hardening one-component lacquers.

DETAILED DESCRIPTION OF THE INVENTION

The diisocyanates (a) used in the process according to the invention are known in polyurethane chemistry. They include diisocyanates corresponding to the general formula $$R^3(NCO)_2$$

wherein
$R^3$ denotes a hydrocarbon group which may contain ester groups and links together the isocyanate groups of an organic diisocyanate having a molecular weight of about 140 to 336.

$R^3$ preferably stands for a divalent aromatic hydrocarbon group with a total of 6 to 15 carbon atoms optionally substituted with alkyl groups and/or optionally having methylene bridges: a divalent saturated aliphatic hydrocarbon group with a total of 4 to 18 carbon atoms optionally containing ester groups; a cycloaliphatic hydrocarbon group with a total of 6 to 15 carbon atoms which is optionally alkyl-substituted and/or optionally carries methylene bridges; an aliphatic-cycloaliphatic, optionally alkyl-substituted, hydrocarbon group having a total of 7 to 15 carbon atoms: or a xylylene group. The terms "aromatic", "aliphatic", "cycloaliphatic" and "aliphatic-cycloaliphatic" used in the above definitions refer in each case to the nature of the carbon atoms linked to the isocyanate groups.

Compounds in which the group $R^3$ is a hydrocarbon group linking the isocyanate groups of 1,6-diisocyanato hexane, isophorone diisocyanate or 2,4-or 2,6-diisocyanato toluene are particularly preferred. Any mixtures of suitable diisocyanates may also be used as starting materials.

The following are examples of suitable starting diisocyanates: 1,4-diisocyanatobutane, 1,5-diisocyanatopentane, 1,6-diisocyanatohexane, 1,8-diisocyanatooctane, 1,10-doospcyanatodecane, 1,12-diisocyanatododecane, isomeric mixtures of 2,2, 4-trimethyl-1,6-diisocyanatohexane and 2, 4,4-trimethyl-1,6-diisocyanatohexane. 2-methyl-1,5-diisocyanatopentane, 2,2-dimethyl-diisocyanatopentane, ≃-isocyanato-caproic acid-(2-isocyanatoethyl)-ester, α, ≃-diisocyanatocaproic acid ethyl ester, 1,4- and 1,3-diisocyanatocyclohexane, 1-isocyanato-3,3,5-trimethyl-5-isocyanatomethyl cyclohexane, 1,4- and 1,3-diisocyanato methyl cyclohexane, 2,4- and 4,4'- diisocyanatodicyclohexyl-methane, 4,4-diisocyanato-dicyclohexyl-propane-(2,2), 1,3- and 1,4-diisocyanatobenzene, 2, 4-diisocyanatotoluene, Z,2,6-diisocyanatotoluene, 2, 4'-and 4,4'-diisocyanatodiphenyl methane, 4,4'-diisocyanatodiphenyl propane-(2,2), 1,3-and 1,4-xylylene-diisocyanate and α,α,α', α'-tetramethyl-m- or -p-xylylene-diisocyanate, naphthylene-1,5-diisocyanate and any mixtures of these compounds. 2,4-diisocyanatotoluene, commercial mixtures thereof with 2,6-diisocyanatotoluene, 1,6-diisocyanato hexane and isophorone diisocyanate are particularly preferred as starting materials (a) for the process according to the invention.

The starting components (b) to be used in the process according to the invention are macropolyols having molecular weights, calculated from the functionality and the hydroxyl group content, of 500 to about 10,000, preferably about 800 to 5,000. The corresponding macrodiols are particularly preferred. The following are examples of suitable macropolyols:

(i) dihydroxy polyesters known from dicarboxylic acids such as succinic acid, adipic acid, suberic acid, azelaic acid, sebacic acid, phthalic acid, isophthalic acid, terephthalic acid, tetrahydrophthalic acid, etc. and diols such as ethylene glycol, propane-1,2-diol, propane-1,3-diol, diethylene glycol, butane-1,4-diol, hexane-1,6diol, octane-1,8-diol, neopentyl glycol, 2-methyl-propane-1,3-diol and various isomeric bis-hydroxymethyl cyclohexanes:

(ii) polylactones known from polyurethane chemistry, e.g. polymers of ϵ-caprolactone started on the above mentioned dihydric alcohols:

(iii) polycarbonates known from polyurethane chemistry such as those obtained by reacting of the above mentioned diols with diaryl carbonates or phosgene:

(iv) polyethers known from polyurethane chemistry, e.g. the polymers or copolymers of tetrahydrofuran, styrene oxide, the butylene oxides, epichlorohydrin and especially propylene oxide prepared from divalent starter molecules such as water and the above mentioned diols or amines containing two NH bonds. A certain proportion of ethylene oxide is advantageously included, provided that the polyether does not contain more than about 30% by weight of ethylene oxide.

The macropolyols used are preferably macrodiols, as already mentioned above, but it would be possible in principle to ensure the degree of branching of the products according to the invention which is essential for the invention, i.e. an average hydroxyl functionality of starting components (b) and (c) above 2, by including macropolyols which have a functionality greater than 2. Such higher than difunctional macropolyols are prepared in known manner in accordance with the methods indicated above by adding trifunctional or higher functional starting materials. Examples of such higher functional starting materials include higher functional alcohols such as glycerol or trimethylene propane which may be used as starting components for branched chain polyester polyols or as starters for the preparation of branched chain polyether polyols.

Starting component (c) contains, as a constituent essential to the invention, aliphatic diols corresponding to the general formula $$R^1[O-(R^2-O-)_nH]_2,$$

wherein
$R^1$, $R^2$ and n have the meanings indicated above.

2,2,4-trimethyl-pentane-1,3-diol (TMPD) which has not been further modified is particularly preferred as the diol corresponding to the above mentioned general formula (n =0). It may be seen from the formula that in addition to TMPD, which is particularly preferred, its ethoxylation and/or propoxylation products containing ether groups and having (on statistical average) up to 4 ether oxygen atoms per molecule or its ester group-containing addition compounds containing up to 4 mol of ϵ-caprolactone per mol of the diol which is free from ester groups may also be used.

These diols which are essential to the invention are used in a quantity of about 1–45% by weight in the process according to the invention, preferably about 3 to 20% by weight, based on the total weight of all of the starting components (a) to (c). The proportion of macropolyols (b) to be used in the process according to the invention is generally about 10 to 60% by weight, preferably about 20 to 50% by weight, based on the total weight of all of the starting components (a) to (c).

Starting component (c) need not exclusively contain diols of the above mentioned type which are essential to the invention, but may also include other polyhydric alcohols having a molecular weight of 62 to 499, preferably 62 to about 300. These include diols such as ethylene glycol, 1,4-dihydroxy butane, 1,3-dihydroxy butane, 1,6-dihydroxy hexane, diethylene glycol, dipropylene glycol, triethylene glycol, tripropylene glycol and/or neopentyl glycol but in particular trifunctional and higher functional alcohols corresponding to the formula $$R^4(OH)_m$$

wherein
- $R^4$ denotes a m-valent aliphatic hydrocarbon group having 2 to 10 carbon atoms optionally containing ether groups and
- m stands for 3, 4, 5 or 6.

Examples of such polyhydric alcohols include hexane-1,2,6-triol, trimethylol propane, glycerol, pentaerythritol, sorbitol and ethoxylation and/or propoxylation products of these polyhydric alcohols, provided that their molecular weight is below 500.

The polyhydric alcohols optionally used as part of component (c) may be present in a quantity of up to about 300 mol %, preferably up to about 100 mol %, based on the diols according to the invention. In particular the higher functional, low molecular weight alcohols are frequently used to adjust the average hydroxyl functionality of all of the polyhydroxyl compounds used in the process according to the invention to the level required for the invention. This average hydroxyl functionality (f) of components (b) and (c) is in the range of 2.05 to 3.5, preferably 2.1 to 2.5, and may be calculated, for example, by means of the following equation $$f = \frac{\Sigma \text{Mols} \times \text{functionality}}{\Sigma \text{Mols}}$$

or from the average molecular weight and the hydroxyl group content.

To carry out the process according to the invention, the starting materials (a) to (c) exemplified above are generally reacted together by a one-shot process in which the diisocyanates (a) are used in a quantity corresponding to an NCO/OH equivalent ratio of about 1.4:1 to 2:1, preferably about 1.4:1 to 1.8:1. The reaction is generally carried out within a temperature range of about 20 to 140° C., preferably about 60° to 120° C. The process according to the invention is generally carried out by first introducing diisocyanate component (a) into the reaction vessel and then adding the polyhydroxyl compounds (b) and (c) with vigorous mixing. Components (b) and (c) or the individual components from which they are constituted may be added to the diisocyanate in any sequence and in the form of mixtures with one another although mixtures of starting components (b) and (c) or of the individual components from which they are composed are generally only used if the components are compatible with one another. If any polyhydroxyl compounds are incompatible with one another, the incompatible compounds are preferably added separately in any desired sequence.

The reaction may be carried out with or without suitable solvents. Preferred solvents are aromatic hydrocarbons such as toluene, xylenes or alkyl benzene mixtures (higher alkylated benzenes) which are obtainable on the market, for example as Solvesso solvent or Solventnaphtha solvent.

If the reaction according to the invention has been carried out in the absence of such a solvent or in only a fraction of the solvent necessary for dissolving the products of the process, it may be further diluted with solvent. The solutions obtained may then be mixed with aromatic solvents of the type exemplified above or with other only slightly polar or apolar solvents such as liquid paraffin hydrocarbons, cyclohexane, methyl cyclohexane, white spirits and/or petroleum ether. Polar solvents such as esters or ketones also may be added but, this is not preferred.

The products of the process according to the invention are moisture hardening lacquer binders suitable for a wide variety of applications. The products according to the invention may be used as binders or binder components for clear lacquers which may be used for lacquering wood or cardboard, or as binders or binder components for pigmented lacquers which may be used as primers such as zinc dust primers, for corrosion protective lacquers or lacquers for wood or plastics. The solubility of the products according to the invention in aromatic solvents is particularly advantageous when the products are used in the last mentioned lacquers since these can then be obtained free from polar solvents. In this form they have no dissolving effect on the plastics surfaces to which they are applied and are not liable to impair the dimensional stability of the object to be lacquered. The products of the process according to the invention are also suitable as mineral primers or undercoats for lacquers used for the protection of buildings.

Lacquers containing the products according to the invention as binders or binder components may contain other known auxiliary agents and additives used in lacquer technology in addition to the solvents and pigments mentioned above. These additional additives include, fillers, levelling agents and catalysts such as dibutyl tin dilaurate or tin (II) octoate for accelerating the reaction between free isocyanate groups and atmospheric moisture which results in chemical cross linking of lacquer films.

The lacquer films based on the products obtained by the process according to the invention are distinguished by their high chemical resistance, great hardness, excellent gloss and good elasticity.

The invention is further illustrated but is not intended to be limited by the following examples in which all parts and percentages are by weight unless otherwise specified.

EXAMPLES

The following abbreviations are used in the examples.

Diol I: a polypropylene glycol with an average molecular weight of 1,000.

Diol II: a polypropylene glycol with an average molecular weight of 2,000.

Diol III: a polyester diol with an average molecular weight of 1,200 based on adipic acid, neopentylglycol and 1,6-dihydroxy hexane (proportions by weight of diols=4:3).

Diol IV: a reaction product containing ether groups obtained from 1 mol of TMPD and 2 mol of propylene oxide (OH number=428).

Polyol I: a polyether polyol with an average molecular weight of 3,700 prepared by the propoxylation of ethylene diamine.
IPDI: 1-isocyanato-3,3,5-trimethyl-5-isocyanatomethyl-cyclohexane.
TDI/80: a mixture of 80% 2,4- and 20% 2,6-diisocyanato toluene.
TDI/100: 2,4-diisocyanatotoluene.
TMP: trimethylol propane.
TMPD: 2,2,4-trimethyl pentane-1,3-diol.

General method of preparation

The diisocyanate was introduced into a stirred vessel at about 25° C. under nitrogen and dissolved in the solvent indicated in the examples of preparation given below. The reactants mentioned in the various examples of preparation were then added with stirring, the relatively high molecular weight polyols being added first, followed by the components which are an essential part of this invention (Diol IV and TMPD) and finally by TMP. The vigorously stirred reaction mixture may be cooled if necessary to maintain the temperature below 80° C. After formation of a homogeneous mixture, heating was continued for about 20 hours to maintain the temperature at 80° to 100° C. By the end of that time, the isocyanate content had reached the theoretical level or fallen slightly below it. The resulting solutions were introduced into dry containers with exclusion of moisture.

Parallel experiments showed that the sequence in which the solvent and polyols were added to the diisocyanate had no influence on the properties of the resulting solutions of the oligourethanes containing isocyanate groups.

EXAMPLE 1

Reaction mixture:

| | |
|---|---|
| 1.72 | mol TDI/80 |
| 0.075 | mol Diol II |
| 0.25 | mol TMP |
| 0.625 | mol TMPD | xylene to prepare a 60% solution.
Characteristic data:
Average hydroxyl functionality of the polyols used: 2.26
NCO/OH equivalent ratio 1.6:1
Solids content of the solution 60%
Isocyanate content of the solution: 5.6%
Monomeric TDI/80 content of the solution: 1.6%
Viscosity of the solution at 23° C.: 1000 mPa.s.

EXAMPLE 2

Reaction mixture:
1.6 mol TDI/100
0.03 mol Polyol I
0.227 mol TMP
0.6 mol TMPD
xylene to prepare a 60% solution.
Characteristic data:
Average hydroxyl functionality of the polyols: 2.33.
NCO/OH equivalent ratio: 1.6:1
Solids content of the solution 60%
NCO content of the solution: 5.9%
Monomeric TDI 100 content of the solution: 0.15%
Viscosity of the solution at 23° C.: 1400 mPa.s.

EXAMPLE 3

Reaction mixture:
1.65 mol TDI/100
0.325 mol Diol I
0.2 mol TMP
0.375 mol TMPD
Mixture of xylene and Solvesso 100 solvent (3:2) to prepare a 70% solution.
Characteristic data:
Average hydroxyl functionality 2.22.
NCO/OH equivalent ratio: 1.65:1
Solids content of the solution: 70%
Isocyanate content of the solution: 5.1%
Monomeric TDI/100 content of the solution: 0.12%
Viscosity of the solution at 23° C.: 1700 mPa.s.

EXAMPLE 4

Reaction mixture:
1.5 mol TDI/100
0.1 mol Diol I
0.525 mol Diol IV
0.25 mol TMP
xylene to prepare a 60% solution.
Characteristic data:
Average hydroxyl functionality: 2.29.
NCO/OH equivalent ratio: 1.5:1
Solids content of the solution: 60%
Isocyanate content of the solution: 4.0%
Monomeric TDI/100 content of the solution: below 0.03%
Viscosity of the solution at 23° C.: 500 mPa.s.

EXAMPLE 5

Reaction mixture:
1.5 mol TDI/100
0.15 mol Diol I
0.55 mol TMPD
0.167 mol TMP
xylene to prepare a 60% solution.
Characteristic data:
Average hydroxyl functionality: 2.19
NCO/OH equivalent ratio: 1.6:1
Solids content of the solution: 60%
NCO content of the solution: 5.25%
Monomeric TDI/100 content of the solution: 0.17%
Viscosity of the solution at 23° C.: 500 mPa.s.

EXAMPLE 6

Reaction mixture:
1.65 mol IPDI
0.325 mol Diol I
0.375 mol TMPD
0.2 mol TMP
xylene to prepare a 70% solution.
Characteristic data:
Average hydroxyl functionality: 2.22
NCO/OH equivalent ratio: 1.65:1
Solids content of the solution: 70%
NCO content of the solution: 4.7%
Monomeric IPDI content of the solution: 0.7%
Viscosity of the solution at 23° C.: 1500 mPa.s.

EXAMPLE 7

Reaction mixture:
1.65 mol IPDI
0.325 mol Diol III
0.375 mol TMPD 0.2 mol TMP
Mixture of xylene and Solvesso 100 solvent (3:2) to prepare a 70% solution.
Characteristic data:
Average hydroxyl functionality: 2.22
NCO/OH equivalent ratio: 1.65:1
Solids content of the solution: 70%
NCO content of the solution: 4.3%
Color index (DIN 53 409) of the solution: 20
Free IPDI content of the solution: 0.3%
Viscosity of the solution at 23° C.: 2000 mPa.s.

Examples 8 and 9 below demonstrate that when other diols besides TMPD were used as chain lengthening agents, clear solution in xylene were still obtained.

EXAMPLE 8

Reaction mixture:
1.7 mol TDI/100
0.2 mol TMP
0.325 mol TMPD
0.15 mol butane-1,4-diol
0.225 mol Diol I
xylene to prepare a 70% solution.
  Characteristic data:
Average hydroxyl functionality: 2.22
NCO/OH equivalent ratio: 1.7:1
Solids content of the solution: 70%
NCO content of the solution: 6.3%
Monomeric TDI/100 content of the solution: 0.4%
Viscosity of the solution at 23° C.: 800 mPa.s.

EXAMPLE 9

Same as Example 8 except that 0.15 mol of neopentyl glycol was used instead of butane-1,4-diol.
Characteristic data:
Average hydroxyl functionality: 2.22
NCO/OH equivalent ratio: 1.7:1
Solids content of the solution: 70%
NCO content of the solution: 6.4%
Monomeric TDI/100 content of the solution: 0.5%
Viscosity of the solution at 23° C.: 640 mPa.s.

EXAMPLE 10

The degree to which the product solutions from Examples 1 to 9 can be diluted at room temperature before cloudiness appears was investigated in this example.

| Product from Example | Dilution with | | |
|---|---|---|---|
| | Xylene | Solvesso 100 Solvent | White spirits |
| 1 | ∞ | ∞ | — |
| 2 | ∞ | ∞ | — |
| 3 | ∞ | <15% | — |
| 4 | ∞ | <10% | — |
| 5 | ∞ | <10% | — |
| 6 | ∞ | ∞ | <20% |
| 7 | ∞ | ∞ | <20% |
| 8 | <10% | <20% | — |
| 9 | <10% | <20% | — |

The results summarized in this table show that all of the oligourethanes according to the invention can be diluted with xylene to concentrations far below a normal working concentration (50 to 25% solution). The same applies to the alkyl aromatic solvent, Solvesso 100. Two of the solutions may also be diluted and worked up with an aliphatic hydrocarbon. The products most difficult to dilute are those which contain other low molecular weight diols in addition to TMPD.

The lacquer properties of some selected oligourethanes according to the invention were investigated in the following example.

EXAMPLE 11

The solution of the given oligourethane was diluted with xylene to a working concentration of 45% and 0.45% of dibutyl tin dilaurate was added as catalyst. Clear lacquer films were applied by roller applicator (width of gap 0.12 mm) to clean, degreased glass plates. The plates were stored at the ambient temperature (20° C. to 25° C.). Clear, colorless, glossy lacquer films were obtained. The results of the measurements are summarized in the Table below.

| | Example 3 | Example 4 | Example 8 |
|---|---|---|---|
| Sand drying (DIN 53 150) | 2 h | 2 h | 2 h |
| Pendulum hardness according to Konig (DIN 53 157) | 160 | 150 | 130 |
| of ethyl glycol acetate | 0 | 0 | 0 |
| ethyl acetate | 1 | 1 | 1 |
| acetone | 1 | 1 | 3 |
| super grade petrol | 0 | 0 | 0 |
| Abrasion according to DIN 53 109 (CS 10/1000 U/10 N) | 20 mg | 18 mg | 25 mg |

The susceptibility to solvent is measured in 5 grades, 0, 1, 2, 3, 4.
0=film completely unchanged
4=film dissolves.
These results demonstrate that the problem to which this invention was directed has been solved. One-component lacquers dissolved only in hydrocarbons can be hardened to high quality, cross linked polyurethane lacquer films.

EXAMPLE 12 (COMPARISON EXAMPLE)

An oligourethane was prepared as in Example 3 except that 0.375 mol of ethane-1,2-diol was used instead of 0.375 mol of TMPD. In the indicated solvent mixture of xylene and Solvesso 100 solvent (3:2), the product did not form a clear solution at temperatures below 30° C. After further dilution with xylene, a diphasic milky-cloudy liquid was obtained which could no longer be worked up into a lacquer.

EXAMPLE 13 (COMPARISON EXAMPLE)

An oligourethane was prepared as in Example 12 but TMPD was replaced by the equal molar quantity of neopentyl glycol. A clear solution was initially obtained in a mixture of xylene and Solvesso 100 solvent, but this solution became turbid after standing overnight. After further dilution with xylene, a milky white, cloudy solution was obtained which could no longer be worked up into a lacquer.

EXAMPLE 14

This example demonstrates how the degree to which a solution of an oligourethane can be diluted with xylene and aromatic alkyl solvents can be greatly improved by the incorporation of a diol according to the present invention. An oligourethane was synthesized from the following components.
1.65 mol 2,4-TDI 0.275 mol Diol I
0.1 mol TMP
0.575 mol diethylene glycol.

The product formed a clear solution in xylene at a concentration of 70%. Its capacity for dilution with xylene and Solvesso 100 solvent was then tested and compared with that of 70% solutions of products which have been synthesized from the save components except that a proportion of the diethylene glycol was replaced by TMPD.

The results are summarized in the Table below.

| Product with | | % in solids content | Solids content to which the solution can be diluted with | |
| --- | --- | --- | --- | --- |
| Diethylene glycol mol | TMPD mol | | Xylene | Solvesso 100 solvent |
| 0.575 | — | — | 30 | 60 |
| 0.525 | 0.05 | 1.1 | 11 | 25 |
| 0.475 | 0.1 | 2.28 | 7 | 20 |
| 0.425 | 0.15 | 3.40 | 3 | 12 |
| 0.375 | 0.2 | 4.35 | ∞ | ∞ |
| 0.325 | 0.25 | 5.65 | ∞ | ∞ |

This test series demonstrates impressively that the dilutability with hydrocarbon solvents can be significantly influenced by even a small proportion of a diol used according to the invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of an oligourethane containing free isocyanate groups which is soluble in aromatic solvents and suitable as a lacquer binder which comprises reacting at an equivalent ratio of isocyanate groups to hydroxyl groups of about 1.4:1 to 2:1
   (a) an organic diisocyanate with
   (b) a macropolyol having a molecular weight of 500 to about 10,000 and
   (c) a low molecular weight polyol component having a molecular weight of 62 to 499 wherein at least a portion of component (c) comprises a diol corresponding to the formula $R^1[-O(R^2-O)_n-H]_2$ wherein
$R^1$ denotes a group corresponding to the formula

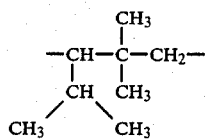

$R^2$ denotes a group corresponding to the formula

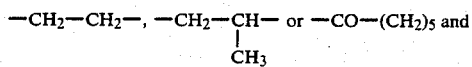

n represents 0, 1 or 2, in an amount that such said diol is present in a quantity of about 1 to 45% by weight, based on the total weight of components (a), (b) and (c) and wherein the nature and quantitative portions of polyhydroxyl compounds (b) and (c) are selected such that the hydroxyl functionality of these compounds is 2.05 to 3.5.

2. The process of claim 1 wherein component (c) additionally comprises a trivalent and/or higher valent, aliphatic alcohol.

3. The process of claim 1 wherein said organic diisocyanate comprises a member selected from the group consisiting of 2,4-diisocyanatotoluene, 2,6-diisocyanatotolune, 1,6-diisocyanatohexane and isophorone diisocyanate.

4. The process of claim 2 wherein said organic diisocyanate comprises a member selected from the group consising of 2,4-diisocyanatotoluene, 2,6-diisocyanatotoluene, 1,6-diisocyanatohexane and isophorone diisocyanate.

5. An oligourethane containing free isocyanate group which is soluble in aromatic solvents, suitable as a lacquer binder and prepared by a process which comprises reacting
   (a) an organic diisocyanate with
   (b) a macropolyol having a molecular weight of 500 to about 10,000 and
   (c) a low molecular weight polyol component having a molecular weight of 62 to 499 wherein at least a portion of component (c) comprises a diol corresponding to the formula $R^1[-O(R^2-O)_n-H]_2$ wherein
$R^1$ denotes a group corresponding to the formula

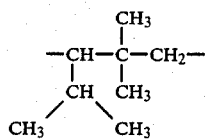

$R^2$ denotes a group corresponding to the formula

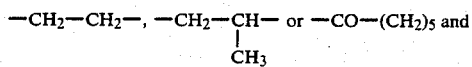

n represents 0, 1 or 2, in an amount that such said diol is present in a quantity of about 1 to 45% by weight, based on the total weight of components (a), (b) and (c) and wherein the nature and quantitative portions of polyhydroxyl compounds (b) and (c) are selected such that the hydroxyl functionality of these compounds is 2.05 to 3.5.

6. The oligourethane of claim 5 wherein component (c) additionally comprises a trivalent and/or higher valent, aliphatic alcohol.

7. The oligourethane of claim 5 wherein said organic diisocyanate comprises a member selected from the group consisting of 2,4-diisocyanatotoluene, 2,6-diisocyanatotolune, 1,6-diisocyanatohexane and isophorone diisocyanate.

8. The oligourethane of claim 6 wherein said organic diisocyanate comprises a member selected from the group consisting of 2,4-diisocyanatotoluene, 2,6-diisocyanatotoluene, 1,6-diisocyanatohexane and isophorone diisocyanate.

9. A process for the preparation of a moisture hardening one-component lacquer which comprises applying a coating composition containing as binder the oligourethane of claim 5 to a substrate and exposing said coated substrate to atmospheric moisture.

* * * * *